(12) United States Patent
Kim et al.

(10) Patent No.: US 9,947,926 B2
(45) Date of Patent: Apr. 17, 2018

(54) METHOD OF FORMING NITROGEN-DOPED POROUS GRAPHENE ENVELOPE

(71) Applicant: KOREA INSTITUTE OF ENERGY RESEARCH, Daejeon (KR)

(72) Inventors: Hee-yeon Kim, Daejeon (KR); Bo-yun Jang, Daejeon (KR); Guk Hyeon Kwon, Andong-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 15/165,776

(22) Filed: May 26, 2016

(65) Prior Publication Data

US 2016/0346769 A1 Dec. 1, 2016

(30) Foreign Application Priority Data

May 28, 2015 (KR) ........................ 10-2015-0075097

(51) Int. Cl.
| | |
|---|---|
| *H01M 4/583* | (2010.01) |
| *H01M 4/36* | (2006.01) |
| *H01M 4/38* | (2006.01) |
| *H01M 4/134* | (2010.01) |
| *H01M 4/62* | (2006.01) |
| *H01M 4/86* | (2006.01) |
| *H01M 4/92* | (2006.01) |

(52) U.S. Cl.
CPC ........... *H01M 4/583* (2013.01); *H01M 4/134* (2013.01); *H01M 4/366* (2013.01); *H01M 4/386* (2013.01); *H01M 4/625* (2013.01); *H01M 4/8673* (2013.01); *H01M 4/926* (2013.01)

(58) Field of Classification Search
None
See application file for complete search history.

(56) References Cited

FOREIGN PATENT DOCUMENTS

| | | |
|---|---|---|
| JP | 09324325 A | 12/1997 |
| JP | 2006306704 A | 11/2006 |
| JP | 2009079251 A | 4/2009 |
| JP | 2009235495 A | 10/2009 |
| JP | 2011506255 A | 3/2011 |
| JP | 2013173660 A | 9/2013 |
| KR | 10-2013-0039456 A | 4/2013 |
| KR | 10-1365716 B1 | 2/2014 |
| KR | 10-2014-0045410 A | 4/2014 |
| KR | 10-2014-0054784 A | 5/2014 |
| WO | 2004060800 A1 | 7/2004 |
| WO | 2012132387 A1 | 10/2012 |

OTHER PUBLICATIONS

Liu et al.; J. Mater. Chem. A.; 2, 11254-11260; 2014.*

(Continued)

*Primary Examiner* — Guinever S Gregorio
(74) *Attorney, Agent, or Firm* — Sughrue Mion, PLLC (57) ABSTRACT

Disclosed is a method of forming a nitrogen-doped porous graphene envelope. The method of forming the nitrogen-doped porous graphene envelope includes dissolving a nitrogen precursor in an organic precursor and then vaporizing the resulting precursor to thus simultaneously synthesize the graphene envelope and perform nitrogen doping in a single step.

6 Claims, 11 Drawing Sheets (56) References Cited

OTHER PUBLICATIONS

Warner et al.; Resilient High Catalytic Performance of Platinum Nanocatalysts with Porous Graphene Envelope; ACS Nano; vol. 9, No. 6; 5947-5957; Jun. 1, 2015.*
Translation of Bando et al. JP 2013-173660; Sep. 21, 2017.*
Dongsheng Geng et al., "Nitrogen doping effects on the structure of graphene," Applied Surface Science, Aug. 15, 2011, pp. 9193-9198, vol. 257, Issue 21.
Chen, Jiuling et al., Effects of nitrogen doping on the structure of carbon nanotubes (CNTs) and activity of Ru/CNTs in ammonia decomposition; Chemical Engineering Journal 156 (2010) 404-410.
Wel, Dacheng; Synthesis of N-Doped Graphene by Chemical Vapor Deposition and Its Electrical Properties; Nano Letters (2009), vol. 9, No. 5, 1752-1758.
Shanmugan; Ramakrishnan; One-step synthesis of Pt-decorated graphene-carbon nanotube for electrochemical sensing of dopamine, uric acid and ascorbic acid; Analytical Methods, Nov. 2014.
Zhang; Yupeng; The production of nitrogen-doped graphene from mixed amine plus ethanol flames; Thin Solid Films 520 (2012) 6850-6855.

\* cited by examiner

METHOD OF FORMING NITROGEN-DOPED POROUS GRAPHENE ENVELOPE

BACKGROUND OF THE INVENTION

1. Field of the Invention

The present invention relates to a method of forming a nitrogen-doped porous graphene envelope, and more particularly to a method of forming a nitrogen-doped porous graphene envelope, the method including dissolving a nitrogen precursor in an organic precursor (a carbon precursor) and then vaporizing the resulting precursor to thus simultaneously synthesize the graphene envelope and perform nitrogen doping in a single step.

2. Description of the Related Art

Ammonia (gas or liquid) or pyridine (liquid) including nitrogen is typically used as a gas or liquid precursor in order to dope carbonized substances with nitrogen. Typically, after carbonized substances, such as carbon nanotubes, graphite, or graphene, are synthesized, nitrogen compounds are added and high-temperature and high-pressure conditions are applied to perform nitrification (nitrogen doping). For example, Applied Surface Science 257 (2011) 9193-9198 by Geng et al. discloses that graphene, which is obtained by treating graphite oxide slurry at 1050° C., is treated at 900° C. in order to dope the surface of graphene with nitrogen. Thin Solid Films 520 (2012) 6850-6855 by Zhang, et al. discloses that a solution, which includes ethanol (70%) and ammonia (30%) mixed therein, is heated to 800° C. or more in order to synthesize nitrogen-doped graphene. As another example, Chemical Engineering Journal 156 (2010) 404-410 by Chen, et al. discloses that $N_2$ microwave plasma is applied with a frequency of 2.45 GHz at 50 to 1000 W to perform treatment under a 60 to 90 Torr condition to thus dope the surface of CNT with nitrogen.

The present invention provides a simple and economical process of simultaneously synthesizing graphene and performing nitrogen doping in a single step without incurring additional costs, instead of high-temperature, high-pressure, and high-cost processes performed in respective stages after graphene is produced.

CITATION LIST

Non-Patent Literature (Non-patent Document 1) Applied Surface Science 257 (2011) 9193-9198
(Non-patent Document 2) Thin Solid Films 520 (2012) 6850-6855
(Non-patent Document 3) Chemical Engineering Journal 156 (2010) 404-410

SUMMARY OF THE INVENTION

Accordingly, the present invention has been made keeping in mind the above problems occurring in the related art, and an object of the present invention is to provide a method of simultaneously synthesizing a graphene envelope and performing nitrogen doping in a single step to form a porous graphene envelope on the surface of a substrate such as a commercial heterogeneous metal catalyst. Thereby, performance (activity) and durability of the substrate, such as the heterogeneous metal catalyst, are improved so as to prevent metal particles from being agglomerated and exfoliated even when the particles thereof are applied to a severe reaction process at a high temperature for a long period of time in the presence of acids or alkalis, and also to prevent the particles from being exfoliated and corroded even under an acidic or basic condition.

In order to accomplish the above object, the present invention provides a method of forming a nitrogen-doped porous graphene envelope, the method including: (S1) vaporizing an organic precursor and a nitrogen precursor to form the graphene envelope in a vaporizer; (S2) providing substrate particles in a reactor in which synthesis is to be performed and then heating the reactor to increase the temperature to a final reaction temperature; and (S3) supplying the organic precursor and the nitrogen precursor of step (S1) to the reactor of step (S2) using a carrier gas, and maintaining the reactor for a predetermined time.

The method may include: (S1) vaporizing an organic precursor and a nitrogen precursor to form a graphene envelope in a vaporizer; (S2) providing nanometal-supported particles or nanoparticle powder in a reactor in which synthesis is to be performed and then heating the reactor to increase the temperature to a final reaction temperature; and (S3) supplying the organic precursor and the nitrogen precursor of step (S1) to the reactor of step (S2) using a carrier gas and maintaining the reactor for a predetermined time. The nanometal-supported particles or nanoparticle powder may be a platinum-supported carbon black catalyst or catalyst powder.

Further, the method may include: (S1) vaporizing an organic precursor and a nitrogen precursor to form a graphene shell in a vaporizer; (S2) providing metal nanoparticles in a reactor in which synthesis is to be performed and then heating the reactor to increase the temperature to a final reaction temperature; (S3) supplying the organic precursor and the nitrogen precursor of step (S1) to the reactor of step (S2) using a carrier gas and maintaining the reactor for a predetermined time. The metal nanoparticles may be particles for catalyst reforming. The metal nanoparticles may be a metal-supported catalyst, and specifically nickel-supported alumina particles or powder.

Moreover, the method may include: (S1) vaporizing an organic precursor and a nitrogen precursor to form a graphene envelope in a vaporizer; (S2) providing silicon nanoparticles in a reactor in which synthesis is to be performed and then heating the reactor to increase the temperature to a final reaction temperature; and (S3) supplying the organic precursor and the nitrogen precursor of step (S1) to the reactor of step (S2) using a carrier gas and maintaining the reactor for a predetermined time. The silicon nanoparticles may be particles for a secondary battery electrode.

Step (S1)

Step (S1) may include vaporizing the organic precursor and the nitrogen precursor while a predetermined temperature and an appropriate gas atmosphere are maintained.

The organic precursor may be a liquid precursor selected from the group consisting of ethanol, methanol, acetylene, and acetone.

The nitrogen precursor may be pyridine.

The step (S1) may include vaporizing a precursor solution which includes the nitrogen precursor dissolved in the organic precursor. More specifically, pyridine, which is the nitrogen precursor, may be dissolved in ethanol, which is the organic precursor, and then vaporized. The mixing ratio of ethanol and pyridine may be adjusted in order to adjust the doping concentration of nitrogen. In the present invention, the concentration of a nitrogen precursor aqueous solution, such as pyridine, may be adjusted to control the incidence of defects of the graphene envelope, which is formed on the surface of the substrate, such as the platinum-supported carbon black catalyst. Accordingly, the porous graphene envelope may be formed on the metal particle surface.

The concentration of the nitrogen precursor in the precursor solution may be more than 0 v/v % and less than or equal to 20 v/v %. When an extremely high porosity is required, the concentration may be up to 50 v/v %. The incidence of defects of the shell (envelope) is increased as the concentration is increased, but when the concentration is more than 20 v/v %, the porosity is very high, and accordingly, the protection performance of the graphene envelope may be insufficiently exhibited.

In the present invention, in order to vaporize the precursor, a vaporizer including a quartz material may be manufactured and positioned in an oven, which is maintained at a predetermined temperature, and the temperature may be increased to vaporize the precursor while the carrier gas flows, to thus enable the vaporized precursor to flow into the reactor in which synthesis is to be performed. Typical examples of the material of the vaporizer include metal materials or glass (quartz or Pyrex). It may be preferable that glass be used as glass is a stable material, which is easy to check the properties and the remaining quantity of contents therein while being maintained at a constant temperature and which does not react with the precursor.

Step (S2)

Step (S2) includes heating the reactor, in which synthesis (a process of forming the porous graphene envelope on the substrate surface) is to be performed, to increase the temperature to the final reaction temperature.

The temperature of the reactor may be increased to 400 to 1100° C. during step (S2). The present invention has a merit in that the metal particles are capable of being coated at low temperatures (about 400° C.) due to the catalytic characteristic of the metal particles, which are a coating target, to thus significantly reduce processing costs.

The reactor may be positioned in a heating furnace, and may include a quartz material. The temperature of the heating furnace may be controlled to adjust the temperature of the reactor.

Step (S3)

Step (S3) may include supplying the precursor, which is vaporized during the step (S1), to the reactor of the step (S2) using the carrier gas, and maintaining the reactor for a predetermined time to thus form the nitrogen-doped porous graphene envelope on the surface of the substrate (the metal nanoparticles, the platinum-supported carbon black catalyst, or the silicon nanoparticles). It is preferable that the precursor, which is vaporized during the step (S1), be transported through the shortest path to the reactor for use in synthesis.

It is preferable that the temperature of a connection tube, through which the vaporizer is connected to the reactor, be maintained at around the boiling point of the vaporized precursor during the step (S3). This is configured in order to prevent condensation or congelation of the precursor, which is vaporized in the oven maintained at a predetermined temperature. The temperature of the connection tube may be maintained using a process of transporting the precursor to the reactor through a gas transportation path, around which a heating line is wound. The temperature of the heating line is maintained around the boiling point of the precursor.

The carrier gas may be an oxygen, hydrogen, argon, helium, or nitrogen gas.

In the step (S3), maintaining the reactor for a predetermined time, may be performed by maintaining the reactor for 10 sec to 30 min after the vaporized precursor reaches the synthesis reactor. During the present step, the vaporized precursor is allowed to flow to the reactor for a predetermined time, the supply of the reaction gas is stopped after a set time, and immediately, the carrier gas is allowed to flow, thereby precisely adjusting the exposure time of the coating target material to the gaseous precursor. This is because the shape of the graphene envelope depends directly on the exposure time. When the exposure time is short, namely, about 10 sec, a thin envelope having the minimum thickness may be manufactured, and the thickness of the envelope may be increased as the exposure time is increased.

Further, the present invention provides a method of manufacturing a platinum-supported carbon black catalyst, which has a nitrogen-doped porous graphene envelope, using the method of forming the nitrogen-doped porous graphene envelope.

Further, the present invention provides a method of manufacturing metal nanoparticles, which have a nitrogen-doped porous graphene envelope, using the method of forming the nitrogen-doped porous graphene envelope. The metal nanoparticles may be particles for catalyst reforming. The metal nanoparticles may be nickel-supported alumina particles.

The present invention also provides a method of manufacturing silicon nanoparticles having a nitrogen-doped porous graphene envelope using the method of forming the nitrogen-doped porous graphene envelope. The silicon nanoparticles may be for a secondary battery.

According to the present invention, a nitrogen-doped graphene envelope may be synthesized in a single step under a mild condition of normal pressure. Specifically, synthesis of the graphene envelope and nitrogen doping are performed simultaneously in a single step to form the porous graphene envelope on the surface of a substrate such as a commercial heterogeneous metal catalyst. Thereby, performance (activity) and durability of the substrate, such as the commercial heterogeneous metal catalyst, may be improved to prevent metal particles from being agglomerated and exfoliated even when the particles are applied to a severe reaction process at a high temperature for a long period of time in the presence of an acid or alkali, and also to prevent the particles from being exfoliated and corroded even under an acidic/basic condition.

Further, the present invention, by adapting a technology of simultaneously forming the graphene envelope on the surface of the substrate, such as the commercial heterogeneous metal catalyst, and performing nitrogen doping in a single step using the process of dissolving the nitrogen precursor in the carbon precursor and then vaporizing the resulting precursor may easily control the thickness, the porosity, and the incidence of defects of the carbon layer which is bonded to the substrate, such as the commercial heterogeneous metal catalyst. Therefore, there is a merit in that the amount of reaction active points on the surface of the substrate, which is exposed to the outside, is easily controlled. For example, when the graphene envelope is formed on a platinum-supported carbon black catalyst, many defects may be dispersed between carbon frames constituting the envelope to thus maintain the activity of the catalyst while protecting the metal particles under the envelope.

Moreover, the present invention has a merit in that formation of the graphene envelope on the surface of the substrate, such as the commercial heterogeneous metal catalyst, and nitrogen doping are performed simultaneously in a single step to thus simplify the process.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred Examples will be described in order to give an understanding of the present invention. The following Examples are intended to illustrate the present invention but do not limit the spirit of the present invention. Further, it will be apparent to those skilled in the art that various changes and modifications can be made within the scope of the present invention as set forth in the appended claims.

Example 1: First Process of Forming (Applying) a Nitrogen-Doped Porous Graphene Envelope on a Commercial Platinum-Supported Carbon Black Catalyst Ethanol (≥99.9%, Merck) was used as an organic precursor for forming a porous graphene shell (graphene envelope) on the surface of a commercial platinum-supported carbon black catalyst, and pyridine (99.8%, Aldrich) was used as a nitrogen precursor for forming pores or defects in the structure of the graphene shell (graphene envelope). Specifically, a precursor solution, which included pyridine dissolved in ethanol, was used. The concentration of pyridine in the precursor solution was set to a volume ratio of 0.5 v/v %.

The quartz or Pyrex vaporizer (vaporizer volume of 150 ml), into which 50 ml of the precursor solution (ethanol including pyridine dissolved therein) was injected, was provided into the oven, which was maintained at a predetermined temperature, in order to vaporize the precursor for forming the graphene envelope. The temperature of the oven was maintained at 70° C. in order to vaporize ethanol.

The reactor for synthesis, which was used to form the graphene envelope, included the quartz material and had a tube shape having a diameter of 25 mm and a length of 300 mm, and the filter, which was made of the quartz material, was provided in the reactor to place the commercial platinum-supported carbon black catalyst therein. Nitrogen (70 sccm) was blown into the synthesis reactor through a bypass line, which did not pass through the vaporizer, for 30 min to remove impurities from the synthesis reactor. The commercial platinum-supported carbon black catalyst powder was placed on the filter, which was made of the quartz material, and vaporized ethanol (ethanol containing pyridine dissolved therein) was transported to the synthesis reactor, which was used to form the graphene shell (graphene envelope), using nitrogen (70 sccm) as the carrier gas. The temperature of the synthesis reactor was maintained at 400° C. and the reaction time was 30 sec. The reaction time was measured from the time when vaporized ethanol reached the synthesis reactor, and the temperature of the synthesis reactor was increased at a rate of 5° C./min from room temperature, and reached 400° C. at the time when vaporized ethanol reached the reactor. The reactor was left until 30 sec after the vaporized ethanol had reached the synthesis reactor to form (apply) a nitrogen-doped porous graphene shell on the commercial platinum-supported carbon black catalyst.

Example 2: Second Process of Forming (Applying) a Nitrogen-Doped Porous Graphene Envelope on a Commercial Platinum-Supported Carbon Black Catalyst The same process as Example 1 was performed, except that the concentration of pyridine was set to a volume ratio of 2 v/v %.

Example 3: Third Process of Forming (Applying) a Nitrogen-Doped Porous Graphene Envelope on a Commercial Platinum-Supported Carbon Black Catalyst The same process as Example 1 was performed, except that the concentration of pyridine was set to a volume ratio of 4 v/v %.

Example 4: Process of Forming (Applying) a Nitrogen-Doped Porous Graphene Envelope on Metal Nanoparticles for Catalyst Reforming The same process as Example 1 was performed, except that a metal-supported catalyst (nickel-supported alumina powder) for catalyst reforming was used as a substrate for applying the graphene envelope thereon.

Example 5: Process of Forming (Applying) a Nitrogen-Doped Porous Graphene Envelope on Silicon Nanoparticles for a Secondary Battery Electrode The same process as Example 1 was performed, except that the silicon nanoparticles for the secondary battery electrode were used as a substrate for applying the graphene envelope thereon.

Comparative Example 1: Process of Forming (Applying) a Non-Porous Graphene Envelope Not Doped with Nitrogen The same process as Example 1 was performed, except that only ethanol, to which pyridine for nitrogen doping was not added, was used as the precursor to synthesize the graphene envelope.

Comparative Example 2

The commercial catalyst (Johnson Matthey Company, Hispec 4000, Pt 40 wt % on carbon black) was used as Comparative Example 2.

Comparative Example 3

The alumina-supported nickel catalyst ($Ni/Al_2O_3$, Ni 5 wt %), on which the graphene envelope was not formed, was used as Comparative Example 3.

Comparative Example 4

The silicon nanoparticles for the secondary battery electrode, on which the graphene envelope was not formed, were used as Comparative Example 4.

Test Example 1: Transmission Electron Microscopy (TEM) Analysis

Figure 1:
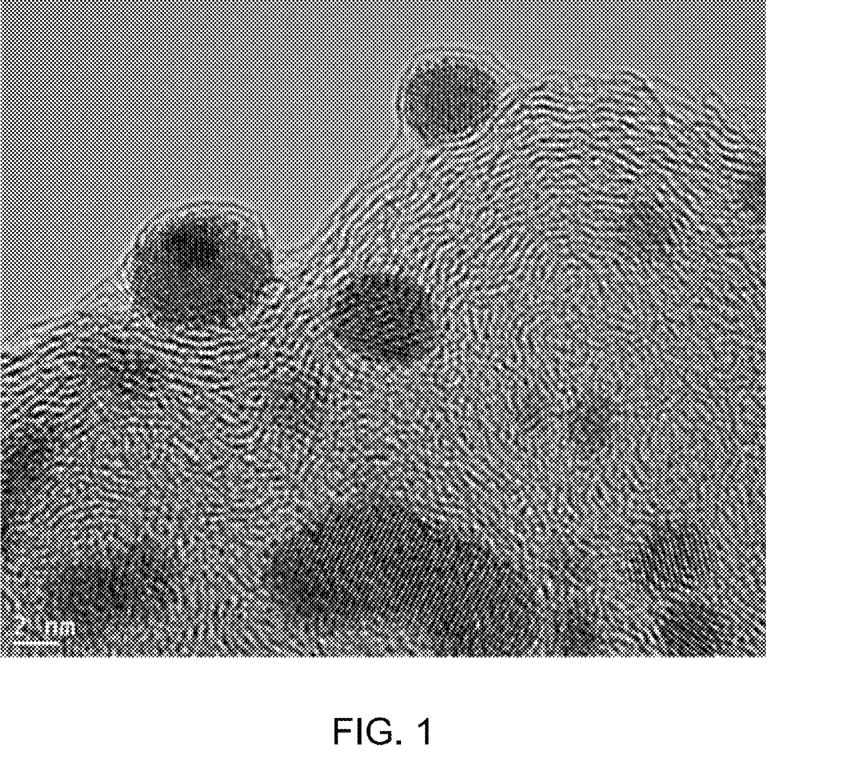
FIG. 1 shows the result of TEM analysis of a nitrogen-doped graphene envelope according to Example 2.
Figure 2:
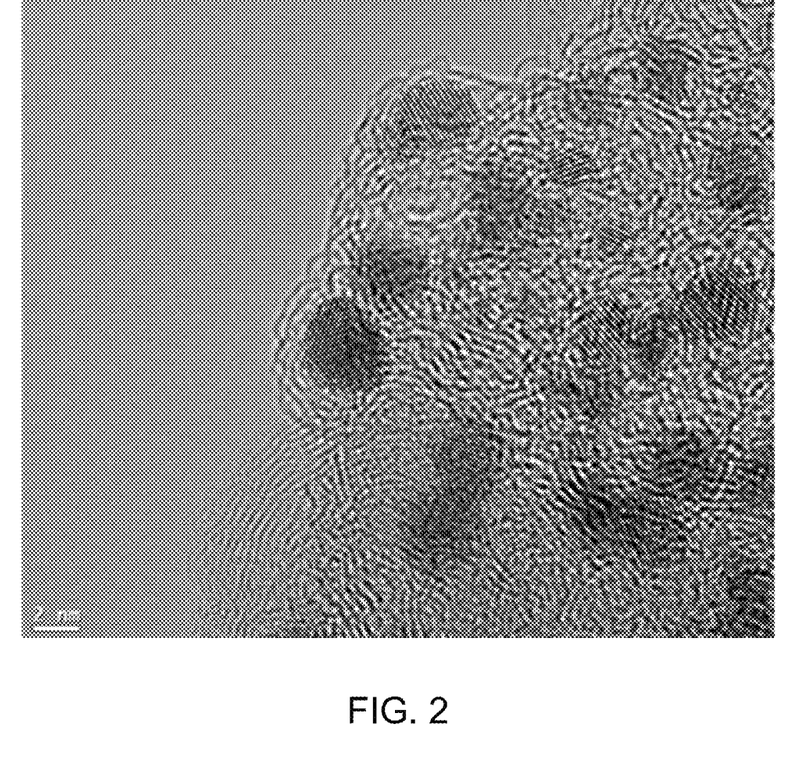
FIG. 2 shows the result of TEM analysis of a graphene envelope according to Comparative Example 1.
Figure 3:
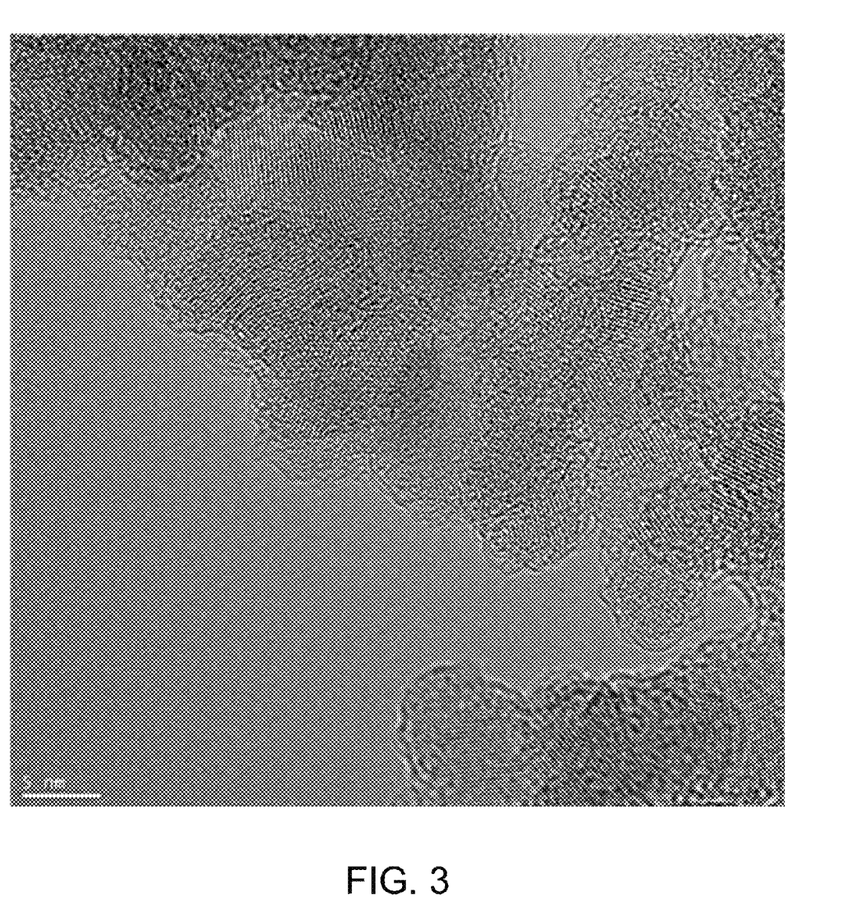
FIG. 3 shows the result of TEM analysis of a nitrogen-doped graphene envelope according to Example 5.

The porous graphene envelope (the porous graphene shell formed on the surface of the metal particles of the commercial platinum-supported carbon black catalyst) according to Example 2, the graphene envelope according to Comparative Example 1, and the porous graphene envelope (the porous graphene shell formed on the silicon nanoparticles) according to Example 5 were analyzed using a transmission electron microscope, and the results are shown in FIGS. 1, 2, and 3. From FIGS. 1, 2, and 3, it can be confirmed that the thickness of the graphene envelope, which covers the surface of the platinum particles dispersed on the surface of the carbon black particles, is reduced as the concentration of added pyridine is increased. It can be confirmed that the porosity or defect of the graphene envelope is increased in proportion to the concentration of added pyridine.

Test Example 2: Evaluation of Electrochemical Performance Using Platinum-Supported Carbon Black Particles Having the Graphene Envelope Electrochemical performance was evaluated using a potentiostat (BioLogic, SP-50) provided with an RRDE (rotating ring disk electrode). Saturated Ag/AgCl was used as a reference electrode, and calibrating was performed relative to a RHE (reversible hydrogen electrode). A glassy carbon disk (3 mm in diameter) and a platinum wire were used as a working electrode and a counter electrode, respectively. In the RRDE system, catalyst ink (0.2 mg Pt; a mixture of 2 mg catalyst, 5 μl Nafion solution (5 wt %, DuPont) and 1 ml ethanol) was loaded on the glassy carbon electrode to thus manufacture the working electrode. RRDE measurement was performed in the $H_2SO_4$ solution (0.5 M) at 25° C. at a scan rate of 5 $mVs^1$ and a rotation rate of 1500 rpm.

Figure 4:
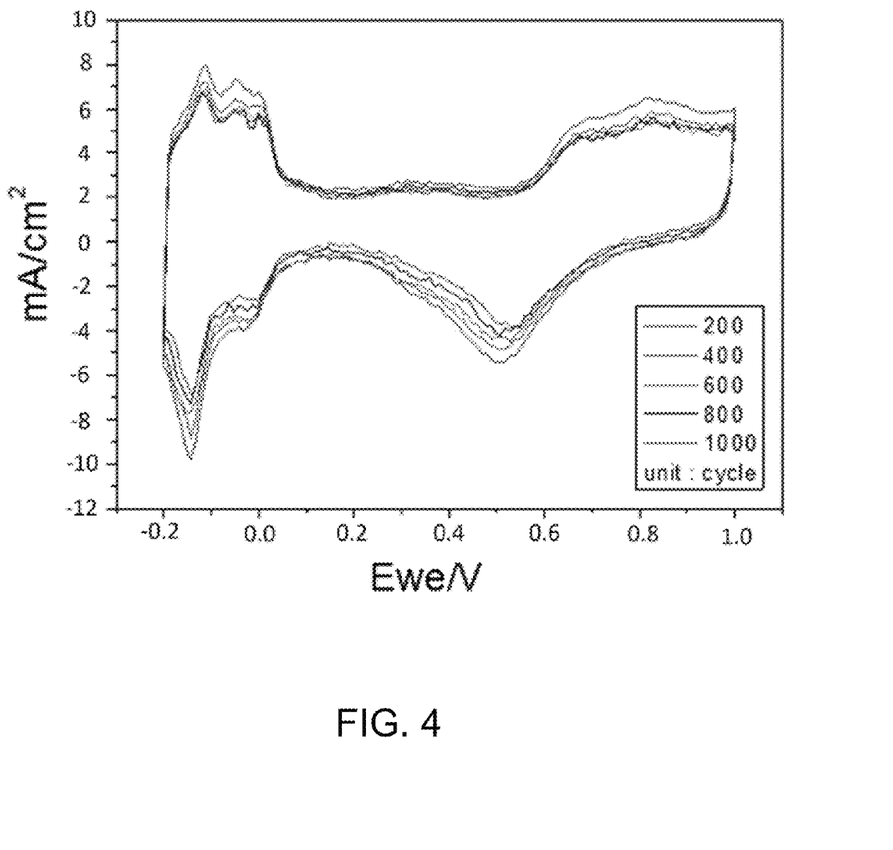
FIG. 4 is a graph showing the result of cyclic voltammetry of Comparative Example 2 (commercial catalyst)
Figure 5:
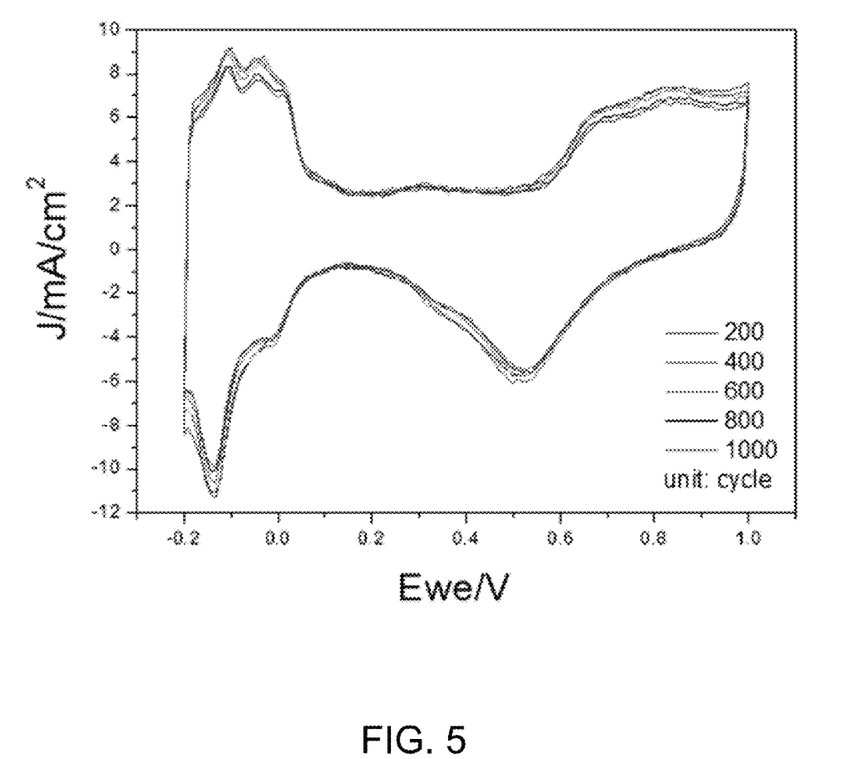
FIGS. 5, 6, and 7 are graphs showing the results of cyclic voltammetry of catalysts synthesized in Example 1, 2, and 3.
Figure 6:
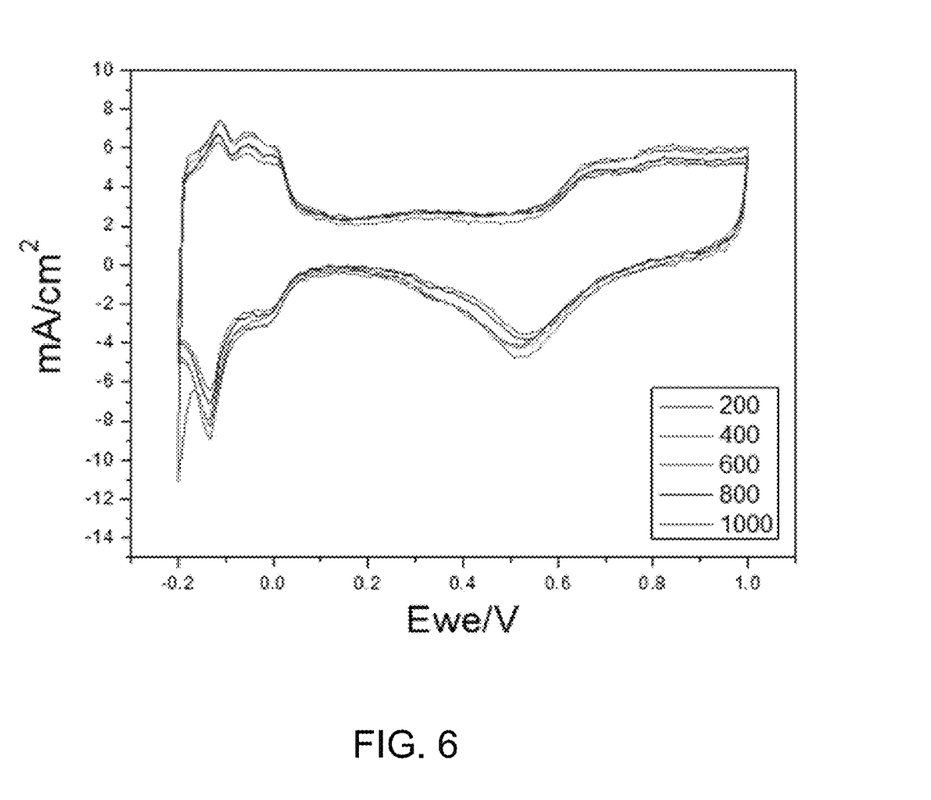
Figure 7:
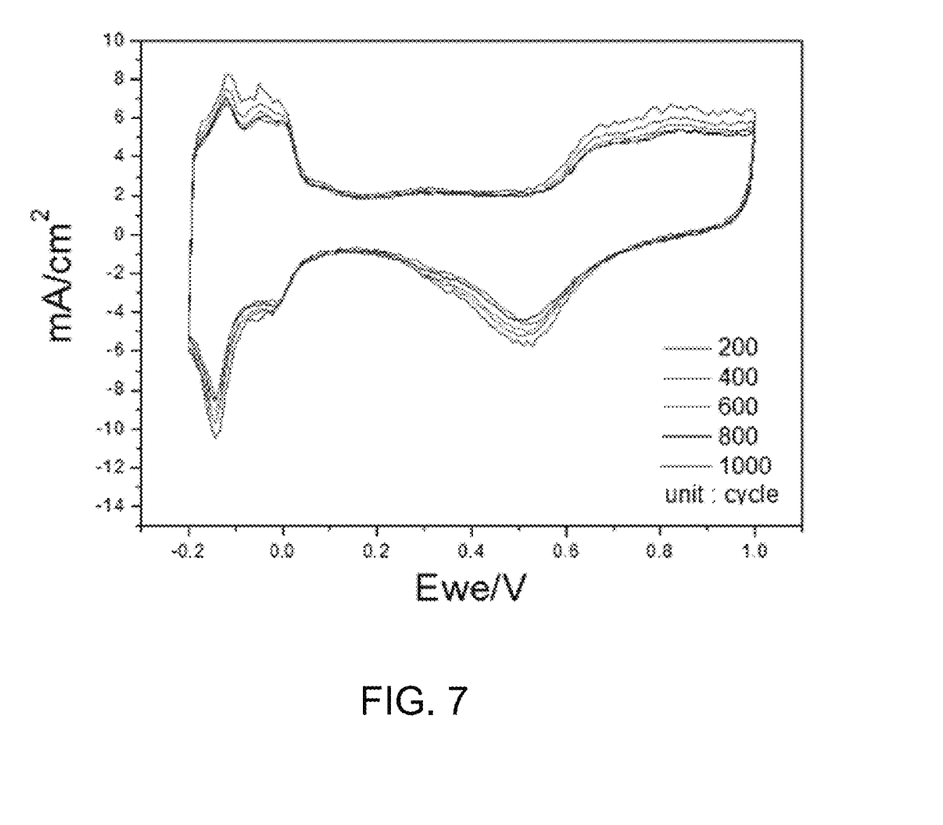
Figure 8:
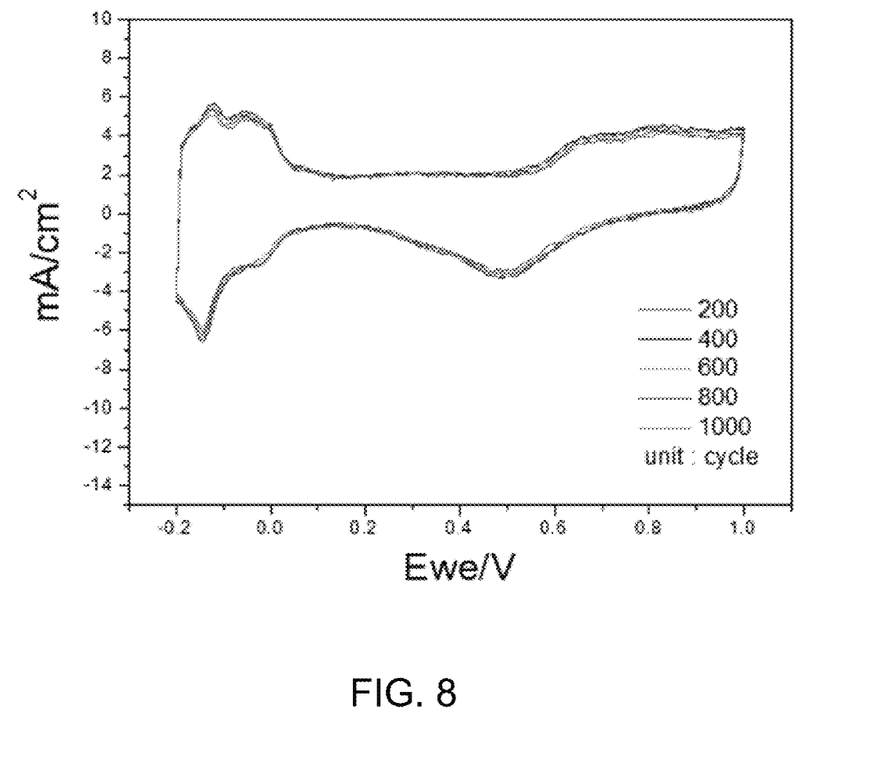
FIG. 8 is a graph showing the result of cyclic voltammetry of a catalyst synthesized in Comparative Example 1.

Electrochemical performance was evaluated using the catalysts synthesized in Examples 1 to 3 and Comparative Example 1 and the commercial catalyst (Comparative Example 2) according to the aforementioned procedure, and the results are shown in FIGS. 4 to 8. From the test results, it was confirmed that when the commercial catalyst (Johnson Matthey Company, Hispec 4000, Pt 40 wt % on carbon black) was used, the activity of the catalyst was reduced by about 30% after 1000 reaction cycles (FIG. 4). This can be judged based on the observation that the platinum catalyst was gradually corroded, agglomerated, or exfoliated as the electrochemical reaction progressed. Meanwhile, it can be confirmed that the reduction in activity as the reaction progresses is insignificant due to the protection effect of the graphene envelope in Examples 1 to 3, in which the nitrogen-doped graphene envelope covers the surface of the commercial catalyst (FIGS. 5 to 7). From FIGS. 5 to 7, it can be confirmed that the reaction activity is reduced by about 12% after 1000 cycles in Example 1, the reaction activity is reduced by about 18% in Example 2, and the reaction activity is reduced by about 22% in Example 3. Meanwhile, it can be confirmed that the reduction in reaction activity is very insignificant, specifically about 5%, after 1000 cycles in Comparative Example 1, in which the number of defects is very low in the structure of the graphene envelope not doped with nitrogen (FIG. 8). In Comparative Example 1, due to the graphene envelope the initial activity is very low. However, deactivation attributable to corrosion, exfoliation, and agglomeration of the catalyst is insignificant, thus only slightly reducing the activity of the reaction even after 1000 cycles due to the graphene envelope.

Figure 9:
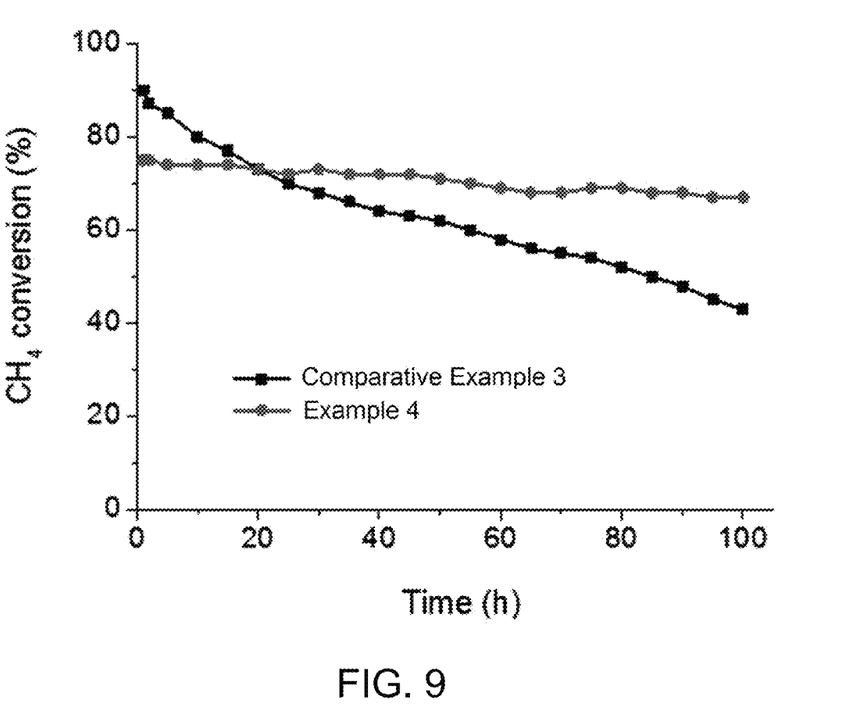
FIG. 9 is a comparative graph showing the result of the carbon dioxide reforming reaction of catalysts of Example 4 and Comparative Example 3.

Test Example 4: Catalytic Reforming Reaction for Manufacturing Hydrogen Using Metal Nanoparticles for Reforming a Catalyst Having a Nitrogen-Doped Porous Graphene Envelope The carbon dioxide reforming reaction of methane was performed using the catalyst to which the nitrogen-doped graphene envelope (using a solution including 0.5 v/v % of pyridine) was applied, according to Example 4, and the nickel-supported alumina catalyst ($Ni/Al_2O_3$, Ni 5 wt %) to which the graphene envelope was not applied, according to Comparative Example 3. The result is shown in FIG. 9. In the carbon dioxide reforming reaction of methane, 0.2 g of the catalyst was placed in the quartz glass reactor, methane and carbon dioxides were blown at a flow rate of 1:1 together with a nitrogen carrier gas ($CH_4:CO_2: N_2$=10:10:80) into the reactor, and the internal temperature of the reactor was maintained at 700° C. The composition of the gas exiting the reactor was analyzed using gas chromatography, and the conversion efficiencies of methane and carbon dioxide and the yield of hydrogen were calculated based on the analysis result. From FIG. 9, it was confirmed that the long-term durability of the catalyst synthesized in Example 4 was excellent.

Figure 10:
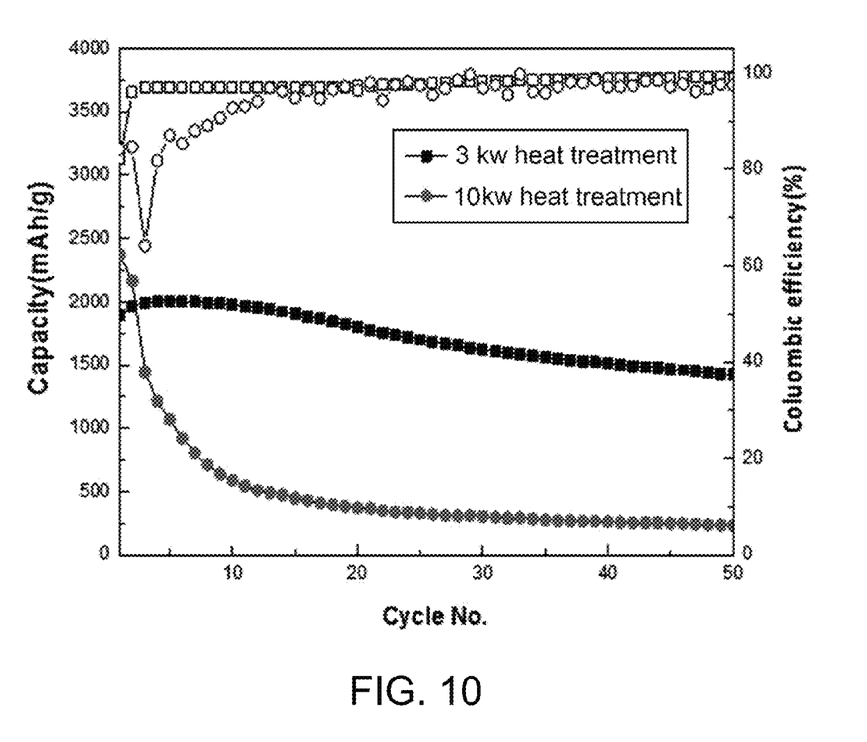
FIG. 10 shows the result of the charging and discharging test of an electrode for a secondary battery, which is manufactured using silicon nanoparticles of Comparative Example 4.
Figure 11:
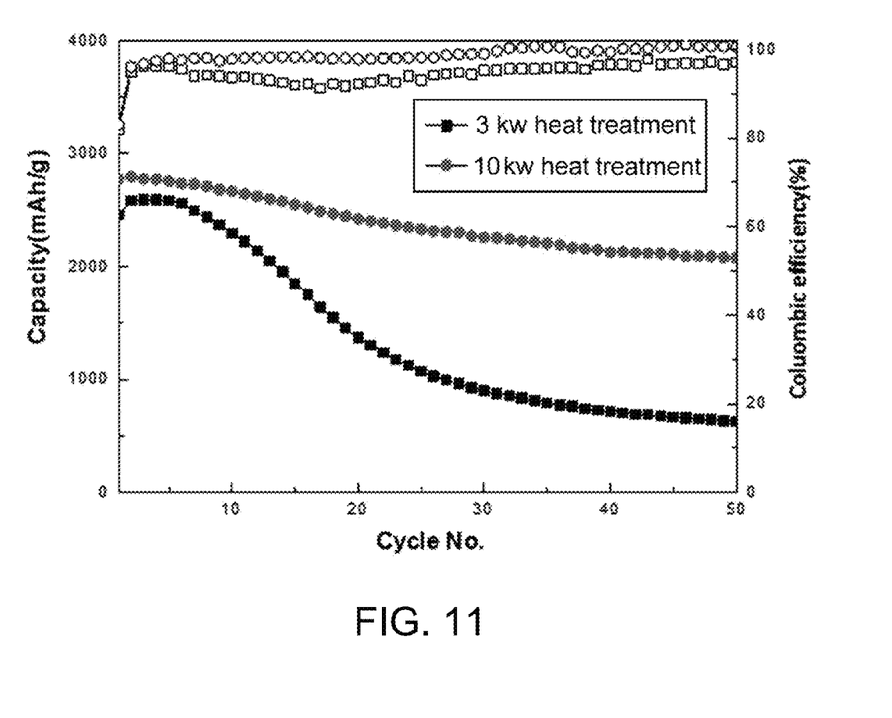
FIG. 11 shows the result of the charging and discharging test of an electrode for a secondary battery, which is manufactured using silicon nanoparticles having a graphene envelope of Example 5.

Test Example 5: Performance Test of a Secondary Battery Using Silicon Nanoparticles Having a Graphene Envelope In order to manufacture the electrode, carbon-coated (graphene envelope-formed) Si nanoparticles (Example 5) and Si nanoparticles not coated with carbon (Comparative Example 4) were used after being heat-treated for 3 min using an anode material. Denka black was used as a conductive agent, and CMC (carboxymethyl cellulose) and SBR (styrene butadiene rubber) as a binder were mixed to manufacture the slurry. After the prepared slurry was uniformly applied on the copper foil and dried in an Ar atmosphere for 30 min, a coin-type (CR2032) half battery was manufactured in a globe box and 1M $LiPF_6$ was used as an electrolyte in order to measure electrochemical characteristics and battery performance. In order to evaluate the performance of the assembled half battery, the charging and discharging test was performed at a voltage in the range of 0.01 to 1.5 V vs $Li/Li^+$ using a constant-current/constant-voltage mode (CC/CV mode) of 0.2 c-rate. The results are shown in FIGS. 10 and 11 and Table 1.

As for the test results, when the carbon coating layer (graphene envelope) had a thickness of 10 nm or less and included less than ten layers of crystal defects, a very high effect was exhibited. Specifically, when carbon coating is not performed, an initial reversible efficiency (Initial Coulombic Efficiency (ICE)) is high, namely, 80% or more, but a capacity retention ratio is reduced to be less than 10% even after 50 cycles. This is typical in an anode to which silicon nanoparticles are applied. When the carbon coating layer is very thick or only graphene layers having a perfect crystal structure are formed, lithium ions do not effectively react with silicon to thus significantly reduce the initial capacity and the initial coulombic efficiency. On the other hand, when the coating thickness is very small, the initial coulombic efficiency and the initial capacity are increased, but the capacity retention ratio is rapidly reduced. The carbon layer (graphene envelope) applied using the method of the present invention has an appropriate thickness (graphene envelope thickness: 2 to 20 nm) and an appropriate number of crystal defects (the incidence of defects: 5 to 30%, the none-graphene region/the total surface area of the particle having the graphene envelope). Accordingly, a high initial coulombic efficiency of about 80% and a high initial reversible capacity of about 2800 mAh/g are ensured, and the capacity retention ratio is improved, being about 75% or higher.

TABLE 1

| | Heat treatment | $1^{st}$ reversible capacity | Initial coulombic efficiency | Retention (%@50 cycle) |
|---|---|---|---|---|
| Example 5 | 3 KW | 2456.63 | 81.91 | 25.35 |
| | 10 KW | 2775.92 | 82.96 | 75.10 |
| Comparative | 3 KW | 1894.34 | 82.17 | 75.19 |
| Example 4 | 10 KW | 2367.92 | 84.11 | 9.79 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of forming a nitrogen-doped porous graphene envelope, the method comprising:
   (S1) vaporizing an organic precursor and a nitrogen precursor to form the graphene envelope in a vaporizer;
   (S2) providing substrate particles in a reactor, in which synthesis is to be performed, and then heating the reactor to increase a temperature to a final reaction temperature; and
   (S3) supplying the organic precursor and the nitrogen precursor of step (S1) using a carrier gas to the reactor of step (S2) and maintaining the reactor for a predetermined time,
   wherein the organic precursor is a liquid precursor selected from the group consisting of ethanol, methanol, acetylene, and acetone, and
   wherein the nitrogen precursor is pyridine.

2. The method of claim 1, wherein the substrate particles are a platinum-supported carbon black catalyst, metal nanoparticles for catalyst reforming, or silicon nanoparticles for a secondary battery electrode.

3. The method of claim 1, wherein the step (S1) includes vaporizing a precursor solution which includes the nitrogen precursor dissolved in the organic precursor.

4. The method of claim 1, wherein the temperature of the reactor is increased to 400 to 1100° C. during the step (S2).

5. The method of claim 1, wherein the carrier gas is an oxygen, hydrogen, argon, helium, or nitrogen gas.

6. A method of forming a nitrogen-doped porous graphene envelope, the method comprising:
   (S1) vaporizing an organic precursor and a nitrogen precursor to form the graphene envelope in a vaporizer;
   (S2) providing substrate particles in a reactor, in which synthesis is to be performed, and then heating the reactor to increase a temperature to a final reaction temperature; and
   (S3) supplying the organic precursor and the nitrogen precursor of step (S1) using a carrier gas to the reactor of step (S2) and maintaining the reactor for a predetermined time,
   wherein the organic precursor is a liquid precursor selected from the group consisting of ethanol, methanol, acetylene, and acetone,
   wherein the substrate particles are metal nanoparticles for catalyst reforming, and
   wherein the metal nanoparticles are nickel-supported alumina particles.

* * * * *